United States Patent
Tsuchida et al.

(10) Patent No.: US 12,404,926 B2
(45) Date of Patent: Sep. 2, 2025

(54) WORK VEHICLE

(71) Applicant: KUBOTA CORPORATION, Osaka (JP)

(72) Inventors: Tomonari Tsuchida, Osaka (JP); Tomoyuki Tanaka, Osaka (JP); Takahiro Matsuo, Osaka (JP); Hiroyuki Aikawa, Osaka (JP); Kazuhiro Wada, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 82 days.

(21) Appl. No.: 18/137,492

(22) Filed: Apr. 21, 2023

(65) Prior Publication Data

US 2023/0417313 A1 Dec. 28, 2023

(30) Foreign Application Priority Data

Jun. 24, 2022 (JP) ................................ 2022-101759

(51) Int. Cl.
*F16H 57/04* (2010.01)
*F16H 57/02* (2012.01)
*F16H 57/031* (2012.01)

(52) U.S. Cl.
CPC ..... *F16H 57/0423* (2013.01); *F16H 57/0457* (2013.01); *F16H 2057/02056* (2013.01); *F16H 57/031* (2013.01); *F16H 57/0409* (2013.01)

(58) Field of Classification Search
CPC .............. F16H 57/031; F16H 57/0409; F16H 57/0426; F16H 57/0457; F16H 2057/02056
See application file for complete search history.

(56) References Cited

U.S. PATENT DOCUMENTS 2,292,086 A * 8/1942 Pritchard ............ F16H 57/0423
184/11.1
2,487,782 A * 11/1949 Beckwith ............ F16H 57/0463
184/13.1

(Continued)

FOREIGN PATENT DOCUMENTS

CN          101412366 A  *  4/2009  ............. B60K 17/08
DE     102017211749 A1  *  1/2019

(Continued)

OTHER PUBLICATIONS

European Search Report issued Nov. 6, 2023 in European family member application No. 23169553.7.

(Continued)

*Primary Examiner* — Adam D Rogers
(74) *Attorney, Agent, or Firm* — Greenblum & Bernstein, P.L.C.

(57) ABSTRACT

A work vehicle including: a transmission configured to receive motive power input from a motive power source, and shift and output the input motive power to a travel device; a transmission case housing the transmission; and a gear pair disposed in the transmission, in a bottom section of an internal space of the transmission case, and including (i) a first power transmission gear configured to rotate about a first rotation axis, and (ii) a second power transmission gear configured to mesh with the first power transmission gear and rotate about a second rotation axis that is parallel with the first rotation axis. The work vehicle further includes at least one gear cover covering the first power transmission gear and the second power transmission gear.

4 Claims, 9 Drawing Sheets

(56) References Cited

U.S. PATENT DOCUMENTS

| | | | | |
|---|---|---|---|---|
| 4,347,759 | A | * | 9/1982 | Renk .................. F16N 7/28 |
| | | | | 74/606 R |
| 4,683,771 | A | | 8/1987 | Sogo et al. |
| 9,103,432 | B2 | * | 8/2015 | Isomura ............. F16H 57/0427 |
| 10,260,616 | B2 | * | 4/2019 | Lee .................... F16H 57/0423 |
| 10,753,407 | B2 | * | 8/2020 | Ono .................... F16D 25/10 |
| 10,935,109 | B2 | * | 3/2021 | Hana ................... F15B 21/041 |
| 11,028,917 | B1 | * | 6/2021 | Chapman ........... F16H 57/0423 |
| 11,536,356 | B2 | * | 12/2022 | Yamaguchi .......... F16H 61/431 |
| 11,718,173 | B2 | * | 8/2023 | Tsuchida ............ F16H 57/0456 |
| | | | | 180/248 |
| 11,796,049 | B2 | * | 10/2023 | Jeong .................. B60K 17/043 |
| 11,975,605 | B2 | * | 5/2024 | Sonoda ................. B60K 17/24 |
| 11,994,201 | B2 | * | 5/2024 | Tsuchida ............ F16H 57/0457 |
| 12,072,014 | B2 | * | 8/2024 | Jinnai ................ F16H 57/0494 |
| 2021/0190200 | A1 | | 6/2021 | Itou |

FOREIGN PATENT DOCUMENTS

| | | | | | |
|---|---|---|---|---|---|
| EP | 1126196 | A1 | * | 8/2001 | ........... F16H 57/023 |
| EP | 2 700 849 | A1 | | 2/2014 | |
| FR | 2552517 | A1 | * | 3/1985 | |
| GB | 182298 | A | * | 7/1922 | |
| GB | 292540 | A | * | 2/1928 | |
| GB | 1426352 | A | * | 2/1976 | ......... F16H 57/0457 |
| JP | 6-213306 | | | 8/1994 | |
| JP | 06249323 | A | * | 9/1994 | |
| JP | 2003-260950 | | | 9/2003 | |
| JP | 2019-95058 | A | | 6/2019 | |
| WO | WO-2014062116 | A1 | * | 4/2014 | ......... F16H 57/0409 |
| WO | 2019/221068 | | | 11/2019 | |

OTHER PUBLICATIONS

Office Action issued in Corresponding JP Patent Application No. 2022-101759, dated Mar. 4, 2025, along with an English translation thereof.

Office Action issued in Corresponding JP Patent Application No. 2022-101759, dated Jul. 15, 2025, along with an English translation thereof.

* cited by examiner

WORK VEHICLE

BACKGROUND OF THE INVENTION

1. Field of the Invention

The present invention relates to a work vehicle.

2. Description of the Related Art

As shown in JP 2019-95058A, there is a work vehicle (a tractor) that includes: a transmission (a shift power transmission device, a forward and rearward travel switching device) configured to receive power input from a motive power source (an engine) and shift and output the input motive power to travel devices (front wheels, rear wheels); and a transmission case that houses the transmission.

SUMMARY OF THE INVENTION

In the above-described work vehicle, in the case where the transmission is provided with a gear pair that includes a first power transmission gear that is rotatable about a first rotation axis and a second power transmission gear that meshes with the first power transmission gear and is rotatable about a second rotation axis that is parallel with the first rotation axis, and the gear pair is disposed in a bottom section of the internal space of the transmission case, the first power transmission gear and the second power transmission gear enter the lubricating oil stored in the transmission case and agitate the lubricating oil. Therefore, if the drive load applied to the first power transmission gear and the second power transmission gear due to the agitation of the lubricating oil increases, the power transmission loss of the transmission increases.

The present invention provides a work vehicle in which motive power can be efficiently transmitted through a transmission despite the first power transmission gear and the second power transmission gear agitating the lubricant oil.

A work vehicle according to one aspect of the present invention includes: a transmission configured to receive motive power input from a motive power source, and shift and output the input motive power to a travel device; a transmission case housing the transmission; and at least one gear pair disposed in the transmission, in a bottom section of an internal space of the transmission case, and including (i) a first power transmission gear configured to rotate about a first rotation axis, and (ii) a second power transmission gear configured to mesh with the first power transmission gear and rotate about a second rotation axis that is parallel with the first rotation axis. The work vehicle further includes at least one gear cover covering the first power transmission gear and the second power transmission gear.

With this configuration, the gear cover prevents the agitation of the lubricating oil by the first power transmission gear and the second power transmission gear from spreading into the lubricating oil storage area in the transmission case. Therefore, the drive load applied to the first power transmission gear and the second power transmission gear due to the agitation of the lubricating oil can be reduced, and the transmission can efficiently transmit motive power despite the first power transmission gear and the second power transmission gear agitating the lubricating oil.

In the above aspect of the present invention, it is preferable that the at least one gear cover is configured to be splittable into a first split cover covering the first power transmission gear and a second split cover covering the second power transmission gear.

With this configuration, when attaching the gear cover, it is possible to split the first split cover and the second split cover. Therefore, it is easier to attach the gear cover.

In the above aspect of the present invention, it is preferable that the second split cover is integrated with a bottom wall of the transmission case.

With this configuration, it is unnecessary to provide a special coupling structure for supporting the second split cover on the transmission case. Therefore, it is possible to support the second split cover on the transmission case at low cost.

In the above aspect of the present invention, it is preferable that the bottom wall is configured to be detachable from a body of the transmission case.

With this configuration, it is possible to attach the second split cover by attaching the bottom wall to the body of the transmission case. Therefore, it is easier to attach the second split case to the transmission case.

In the above aspect of the present invention, it is preferable that the travel device includes a front wheel and a rear travel device, the transmission includes a front-wheel power transmission section configured to be switchable to (i) an equal-speed power transmission state, in which the front-wheel power transmission section transmits motive power to the front wheel in such a manner that a peripheral speed of the front wheel is equal to a peripheral speed of the rear travel device, and (ii) a speed-increasing power transmission state, in which the front-wheel power transmission unit transmits motive power to the front wheel in such a manner that the peripheral speed of the front wheel is higher than the peripheral speed of the rear travel device, the at least one gear pair includes a gear pair disposed in the front-wheel power transmission section and configured to realize the equal-speed power transmission state, and a gear pair disposed in the front-wheel power transmission section and configured to realize the speed-increasing power transmission state, and the at least one gear cover includes a gear cover covering the gear pair configured to realize the equal-speed power transmission state, and a gear cover covering the gear pair configured to realize the speed-increasing power transmission state.

With this configuration, it is possible to enable the work vehicle to turn with a normal turning radius by switching the front-wheel power transmission unit to the equal-speed power transmission state so that the peripheral speed of the front wheel is equal to the peripheral speed of the rear travel device, and enable the work vehicle to turn with a smaller turning radius than the normal turning radius by switching the front-wheel power transmission unit to the front-wheel speed-increasing power transmission state so that peripheral speed of the front wheel is higher than the peripheral speed of the rear travel device. Therefore, a turning radius can be selected based on the task, the work area, and so on. Despite the configuration that allows selection of turning radius, in the gear pair that realizes the equal-speed power transmission state and the gear pair that realizes the front-wheel speed-increasing power transmission state, the gear cover reduces the drive load applied to the first power transmission gear and the second power transmission gear due to the agitation of the lubricating oil, and accordingly enables the transmission to efficiently transmit motive power.

DETAILED DESCRIPTION OF PREFERRED EMBODIMENTS

Figure 1:
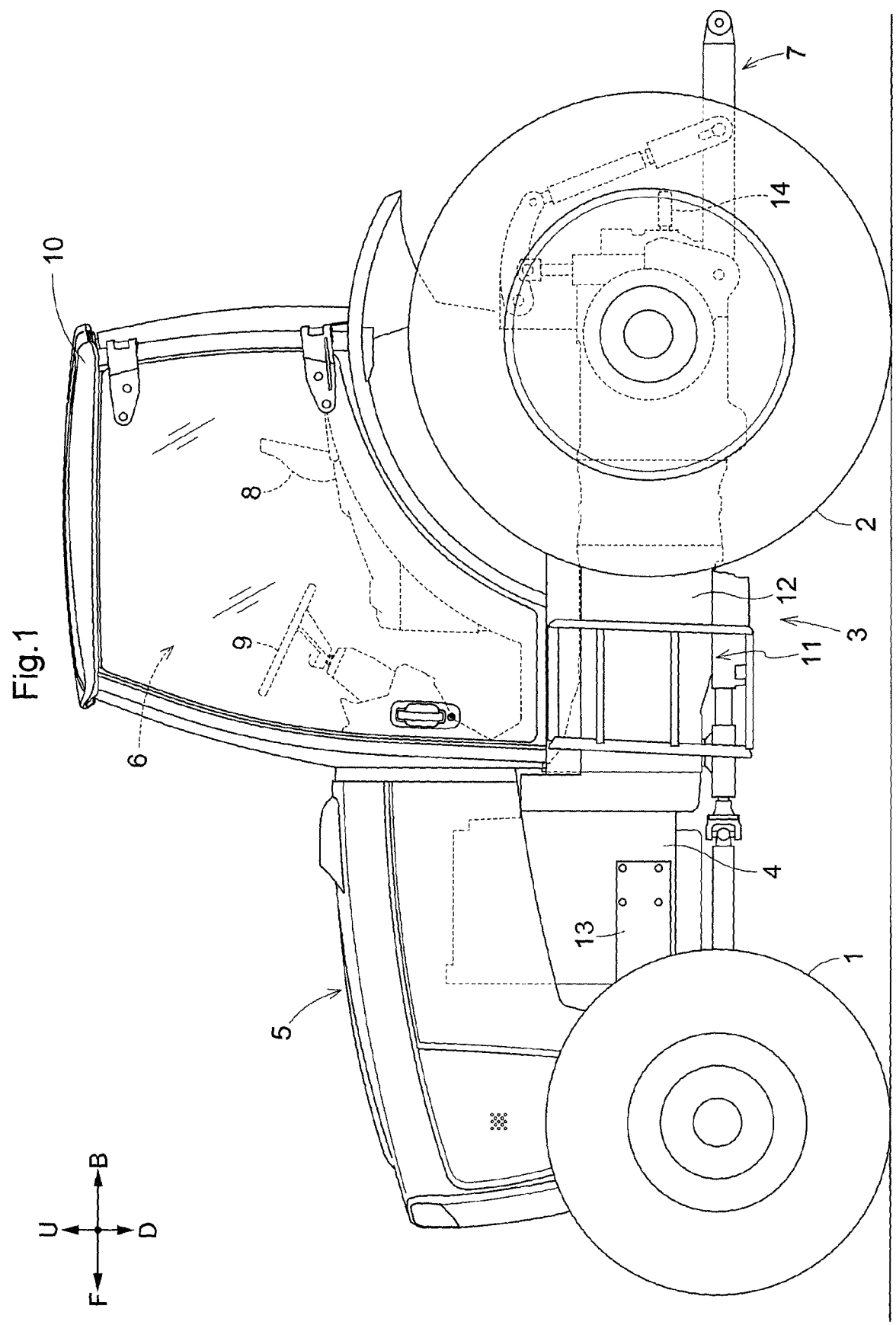
FIG. 1 is a side view showing the entirety of a tractor.

Hereinafter, an embodiment of a tractor that is an example of a work vehicle according to the present invention will be described based on the drawings. In the embodiment, a front-rear direction with respect to a travel body of the tractor is defined as the direction in which the body travels in a working state thereof, and a left-right direction with respect to the body is defined as the left-right direction seen in the direction in which the body travels. Specifically, the direction indicated by the reference sign (F) in FIG. 1 is the forward direction with respect to the body, the direction indicated by the reference sign (B) in FIG. 1 is the rear ward direction with respect to the body, the direction indicated by the reference sign (U) in FIG. 1 is the upward direction with respect to the body, and the direction indicated by the reference sign (D) in FIG. 1 is the downward direction with respect to the body. The front side of the sheet of FIG. 1 corresponds to the left side of the body, and the back side of the sheet of FIG. 1 corresponds to the right side of the body. Therefore, the left-right direction with respect to the body corresponds to the width direction of the body.

Entirety of Tractor

FIG. 1 shows a tractor. This tractor includes a travel body 3 that is supported by a pair of left and right front wheels 1 (travel devices) that are steerable and drivable, and pair of left and right rear wheels 2 (travel devices) that are steerable. A prime mover 5 that includes an engine 4 is provided in a front section of the travel body 3. A driving section 6 on which an operator boards and operates the vehicle, and a linkage mechanism 7 that couples work devices such as a rotary tillage device with each other so that the work devices can be raised and lowered, are provided in a rear section of the travel body 3. The driving section 6 includes a driver's seat 8, a steering wheel 9 for steering the front wheels 1, and a cabin 10 that covers the boarding space. Body frames 11 of the travel body 3 are constituted by the engine 4, a transmission case 12 whose front section is coupled to a rear section of the engine 4, front-wheel support frames 13 coupled to a lower section of the engine 4, and so on. A PTO shaft 14 that transmits motive power from the engine 4 to the work devices coupled to each other by the linkage mechanism 7 is provided in a rear section of the transmission case 12.

Motive Power Transmission Device for Travel

Figure 2:
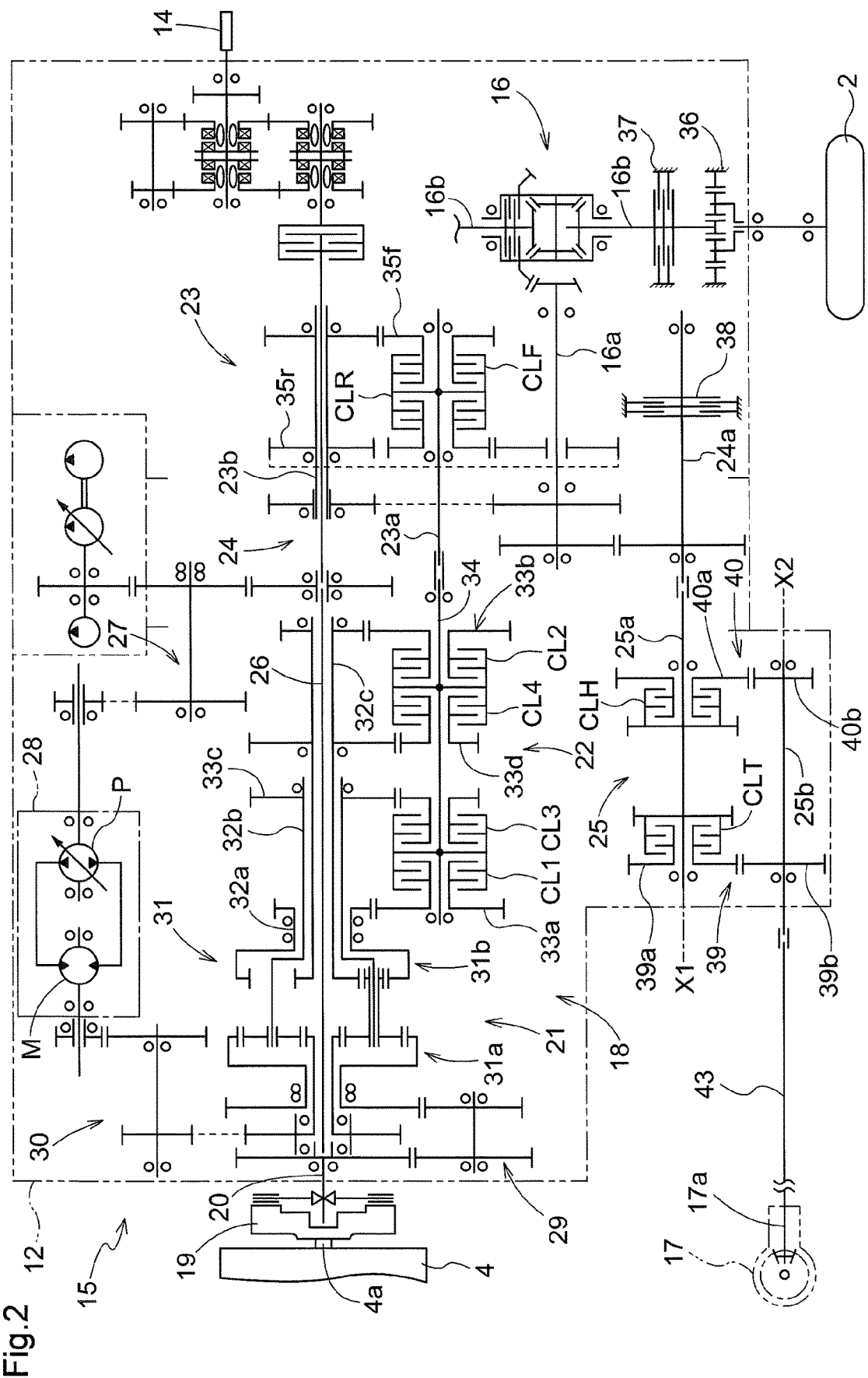
FIG. 2 is a schematic view showing a motive power transmission device.

As shown in FIG. 2, a motive power transmission device 15 for travel, which transmits motive power to the front wheels 1 and the rear wheels 2, includes a transmission 18 that shifts and transmits the motive power from the engine 4, which serves as a motive power source, to a rear wheel differential mechanism 16 and a front wheel differential mechanism 17. The transmission 18 is housed in the transmission case 12.

Figure 3:
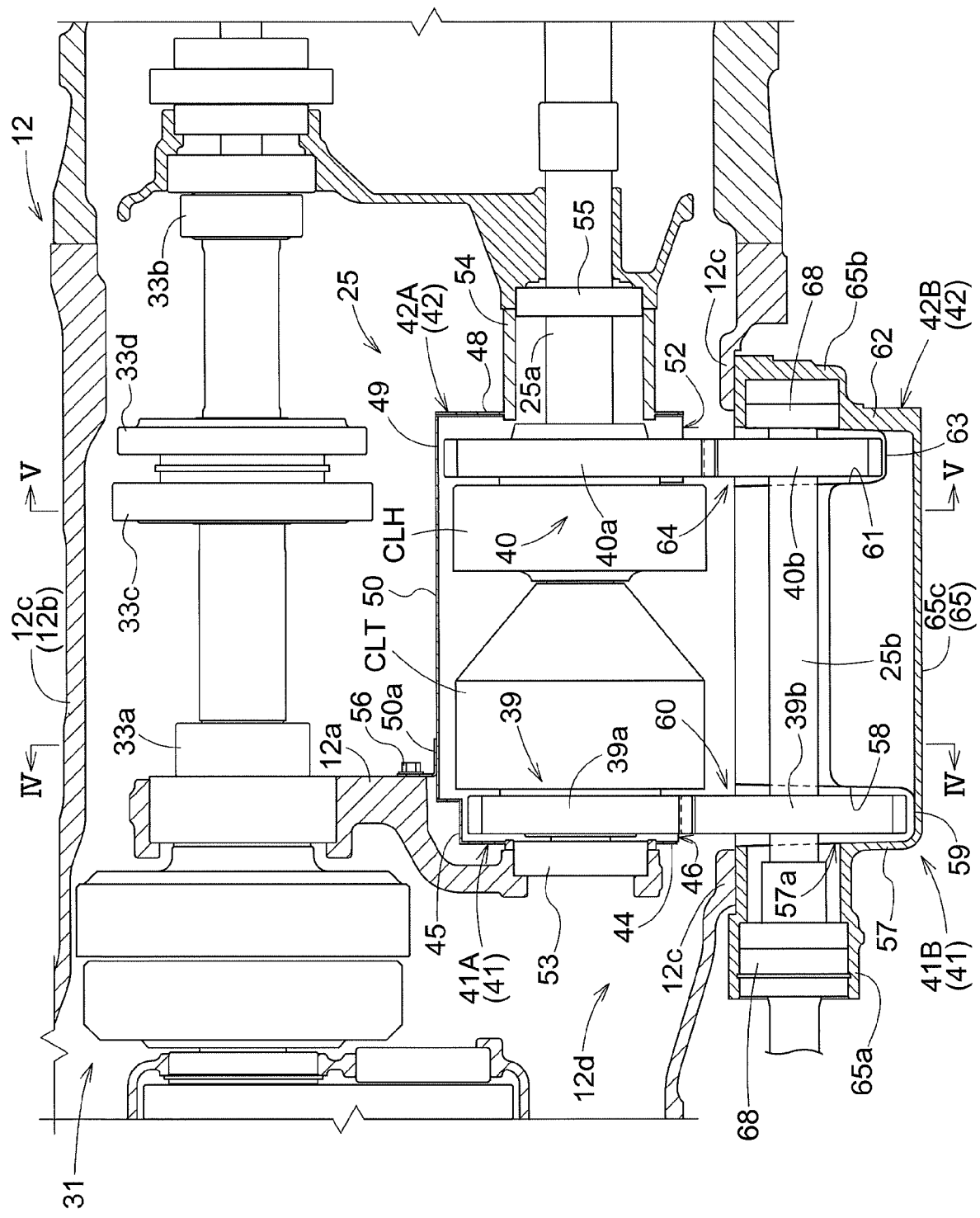
FIG. 3 is a side view showing a front-wheel power transmission unit.

As shown in FIG. 3, the transmission 18 includes an input shaft 20 to which motive power from an output shaft 4a of the engine 4 is transmitted via a main clutch 19, a main transmission unit 21 to which motive power from the input shaft 20 is input, and that shifts and outputs the input motive power, a stepwise power transmission unit 22 to which the output from the main transmission unit 21 is input, a forward and rearward travel switching device 23 to which the output from the stepwise power transmission unit 22 is input, a gear interlocking mechanism 24 that transmits the output from the forward and rearward travel switching device 23 to an input shaft 16a of the rear wheel differential mechanism 16, and a front-wheel power transmission unit 25 to which the output from the forward and rearward travel switching device 23 is input.

Main Transmission Unit

As shown in FIG. 2, the main transmission unit 21 includes a continuously variable transmission device 28 to which motive power from the input shaft 20 is input via a rotation shaft 26 and a gear interlocking mechanism 27, and a planetary transmission device 31 to which motive power from the input shaft 20 is input via a gear interlocking mechanism 29 and to which the output from the continuously variable transmission device 28 is input via a gear interlocking mechanism 30.

The continuously variable transmission device 28 includes a variable displacement hydraulic pump P to which motive power from the input shaft 20 is input via the rotation shaft 26 and the gear interlocking mechanism 27, and a hydraulic motor M that is driven by pressure oil from the hydraulic pump P. By changing the swash plate angle of the hydraulic pump P, the continuously variable transmission device 28 shifts the motive power from the input shaft 20 into forward rotation motive power or reverse rotation motive power, steplessly changes the rotation speed of the forward rotation motive power or the reverse rotation motive power, and output the motive power from the hydraulic pump P. The continuously variable transmission device 28 is formed as a hydraulic static continuously variable transmission device.

The planetary transmission device 31 includes a first planetary transmission unit 31a to which the motive power from the input shaft 20 is input via the gear interlocking mechanism 29, and to which the output from the continuously variable transmission device 28 is input via the gear interlocking mechanism 30, and a second planetary transmission unit 31b that is interlocked with the first planetary transmission unit 31a. The interlocking of the first planetary transmission unit 31a and the second planetary transmission unit 31b is realized by the planetary gear of the first planetary transmission unit 31a and the planetary gear of the second planetary transmission unit 31b interlocking with each other. The planetary transmission device 31 is formed as a combined planetary transmission device.

In the main transmission unit 21, the continuously variable transmission device 28 shifts the motive power from the engine 4 into forward rotation motive power or reverse rotation motive power and steplessly changes the rotation speed of the forward rotation motive power or reverse rotation motive power, and the output from the continuously variable transmission device 28 and the motive power from the engine 4 are combined with each other by the first planetary transmission unit 31a and the second planetary transmission unit 31b in the planetary transmission device 31, and the combined motive power is output from three output shafts 32a, 32b, and 32c.

Stepwise Power Transmission Unit

The stepwise power transmission unit 22 includes a first gear interlocking mechanism 33a that is coupled to the first output shaft 32a of the three output shaft 32a, 32b, and 32c of the planetary transmission device 31, a second gear interlocking mechanism 33b that is coupled to the third output shaft 32c of the three output shaft 32a, 32b, and 32c, a third gear interlocking mechanism 33c that is coupled to the second output shaft 32b of the three output shaft 32a, 32b, and 32c, and a fourth gear interlocking mechanism 33d that is coupled to the third output shaft 32c of the three output shaft 32a, 32b, and 32c. The first gear interlocking mechanism 33a is configured to be interlocked with and coupled to the output shaft 34 via a first clutch CL1. The second gear interlocking mechanism 33b is configured to be interlocked with and coupled to the output shaft 34 via a second clutch CL2. The third gear interlocking mechanism 33c is configured to be interlocked with and coupled to the output shaft 34 via a third clutch CL3. The fourth gear interlocking mechanism 33d is configured to be interlocked with and coupled to the output shaft 34 via a fourth clutch CL4.

In the stepwise power transmission unit 22, when the first clutch CL1 is engaged, the continuously variable transmission device 28 is shifted and the steplessly shifted output from the planetary transmission device 31 is output from the output shaft 34 as motive power that has been shifted steplessly in a first speed range. When the second clutch CL2 is engaged, the continuously variable transmission device 28 is shifted and the steplessly shifted output from the planetary transmission device 31 is output from the output shaft 34 as motive power that has been shifted steplessly in a second speed range that is higher than the first speed range. When the third clutch CL3 is engaged, the continuously variable transmission device 28 is shifted and the steplessly shifted output from the planetary transmission device 31 is output from the output shaft 34 as motive power that has been shifted steplessly in a third speed range that is higher than the second speed range. When the fourth clutch CL4 is engaged, the continuously variable transmission device 28 is shifted and the steplessly shifted output from the planetary transmission device 31 is output from the output shaft 34 as motive power that has been shifted steplessly in a fourth speed range that is higher than the third speed range.

Forward and Rearward Travel Switching Device

The forward and rearward travel switching device 23 includes an input shaft 23a that is coupled to the output shaft 34 of the stepwise power transmission unit 22, and a forward travel clutch CLF and a rearward travel clutch CLR that are provided on the input shaft 23a.

The forward travel clutch CLF is configured to be interlocked with and coupled to an output shaft 23b via a forward travel gear interlocking mechanism 35f. The rearward travel clutch CLR is configured to be interlocked with and coupled to the output shaft 23b via a rearward travel gear interlocking mechanism 35r.

In the forward and rearward travel switching device 23, the output from the stepwise power transmission unit 22 is input to the input shaft 23a, and when the forward travel clutch CLF is engaged, the motive power from the input shaft 23a is converted by the forward travel gear interlocking mechanism 35f to forward travel power, which is output from the output shaft 23b, and when the rearward travel clutch CLR is engaged, the motive power from the input shaft 23a is converted by the rearward travel gear interlocking mechanism 35r to rearward travel power, which is output from the output shaft 23b. The forward travel power and the rearward travel power output from the output shaft 23b are input by the gear interlocking mechanism 24 to the rear wheel differential mechanism 16 and the front-wheel power transmission unit 25.

In the rear wheel differential mechanism 16, the input motive power is transmitted from left and right output shafts 16b to the left and right rear wheels 2. The motive power from the left output shaft 16b is transmitted to the left rear wheel 2 via a planetary deceleration mechanism 36. The left output shaft 16b is provided with a steering brake 37. Although not shown, the power transmission system from the right output shaft 16b to the right rear wheel 2 is provided with the planetary deceleration mechanism 36 and the steering brake 37, as with the power transmission system to the left rear wheel 2.

Front-Wheel Power Transmission Unit

Figure 4:
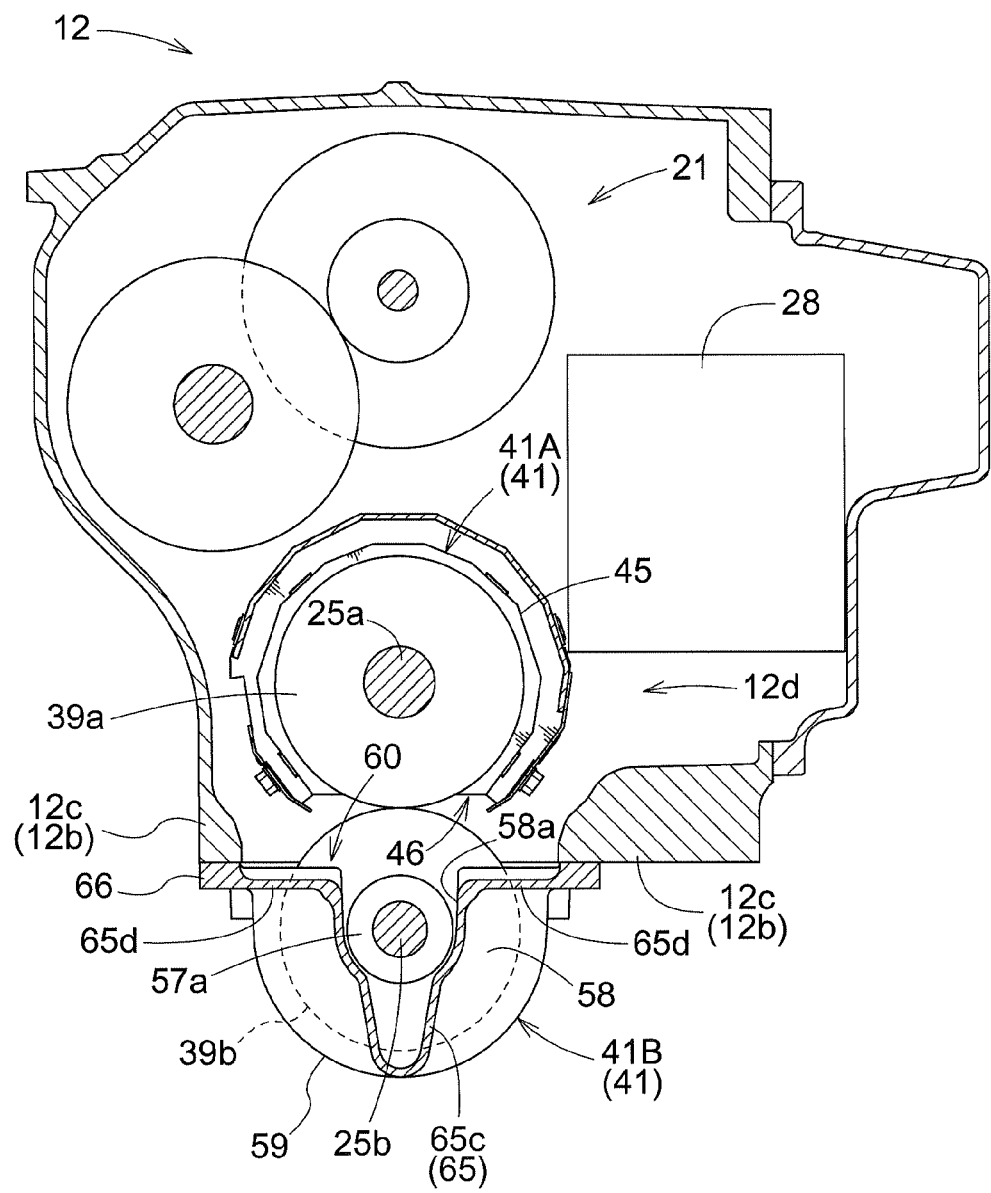
FIG. 4 is a cross-sectional view taken along the line IV-IV in FIG. 3.

As shown in FIGS. 3 and 4, the front-wheel power transmission unit is provided in a bottom section 12d of the internal space of the transmission case 12. As shown in FIG. 2, the front-wheel power transmission unit 25 includes an input shaft 25a that is coupled to an output shaft 24a of the gear interlocking mechanism 24, and an output shaft 25b that is parallel with the input shaft 25a. The input shaft 25a and the output shaft 25b are provided in such a manner as to extend in the front-rear direction of the transmission case 12 (the front-rear direction with respect to the body), and the output shaft 25b is at a lower position than the input shaft 25a with respect to the transmission case (with respect to the body of the tractor). The output shaft 24a of the gear interlocking mechanism 24 is provided with a parking brake 38.

As shown in FIG. 2, the input shaft 25a is provided with an equal-speed clutch CLT and a speed-increasing clutch CLH that is rearward of the equal-speed clutch CLT with respect to the transmission case.

An equal-speed gear pair 39 is provided over the equal-speed clutch CLT and the output shaft 25b. The equal-speed gear pair 39 includes a first equal-speed power transmission gear 39a and a second equal-speed power transmission gear 39b, where the first equal-speed power transmission gear 39a is coupled to an output-side member of the equal-speed clutch CLT and is rotatable about a first rotation axis X1, which is the axis of the input shaft 25a, and the second equal-speed power transmission gear 39b is provided on the output shaft 25b, meshes with the first equal-speed power transmission gear 39a, and is rotatable about a second rotation axis X2, which is the axis of the output shaft 25b. The equal-speed gear pair 39 is configured to realize an equal-speed power transmission state in which the peripheral speed of the front wheels 1 is equal to the peripheral speed of the rear wheels 2, by controlling the power transmission gear ratio between the first equal-speed power transmission gear 39a and the second equal-speed power transmission gear 39b.

A speed-increasing gear pair 40 is provided over the speed-increasing clutch CLH and the output shaft 25b. The speed-increasing gear pair 40 includes a first speed-increasing power transmission gear 40a and a second speed-increasing power transmission gear 40b, where the first speed-increasing power transmission gear 40a is coupled to an output-side member of the speed-increasing clutch CLH and is rotatable about the first rotation axis X1, which is the axis of the input shaft 25a, and the second speed-increasing power transmission gear 40b is provided on the output shaft 25b, meshes with the first speed-increasing power transmission gear 40a, and is rotatable about the second rotation axis X2, which is the axis of the output shaft 25b. The speed-increasing gear pair 40 is configured to realize a front-wheel speed-increasing power transmission state in which the peripheral speed of the front wheels 1 is higher than the peripheral speed of the rear wheels 2 by controlling the power transmission gear ratio between the first speed-increasing power transmission gear 40a and the second speed-increasing power transmission gear 40b.

Figure 5:
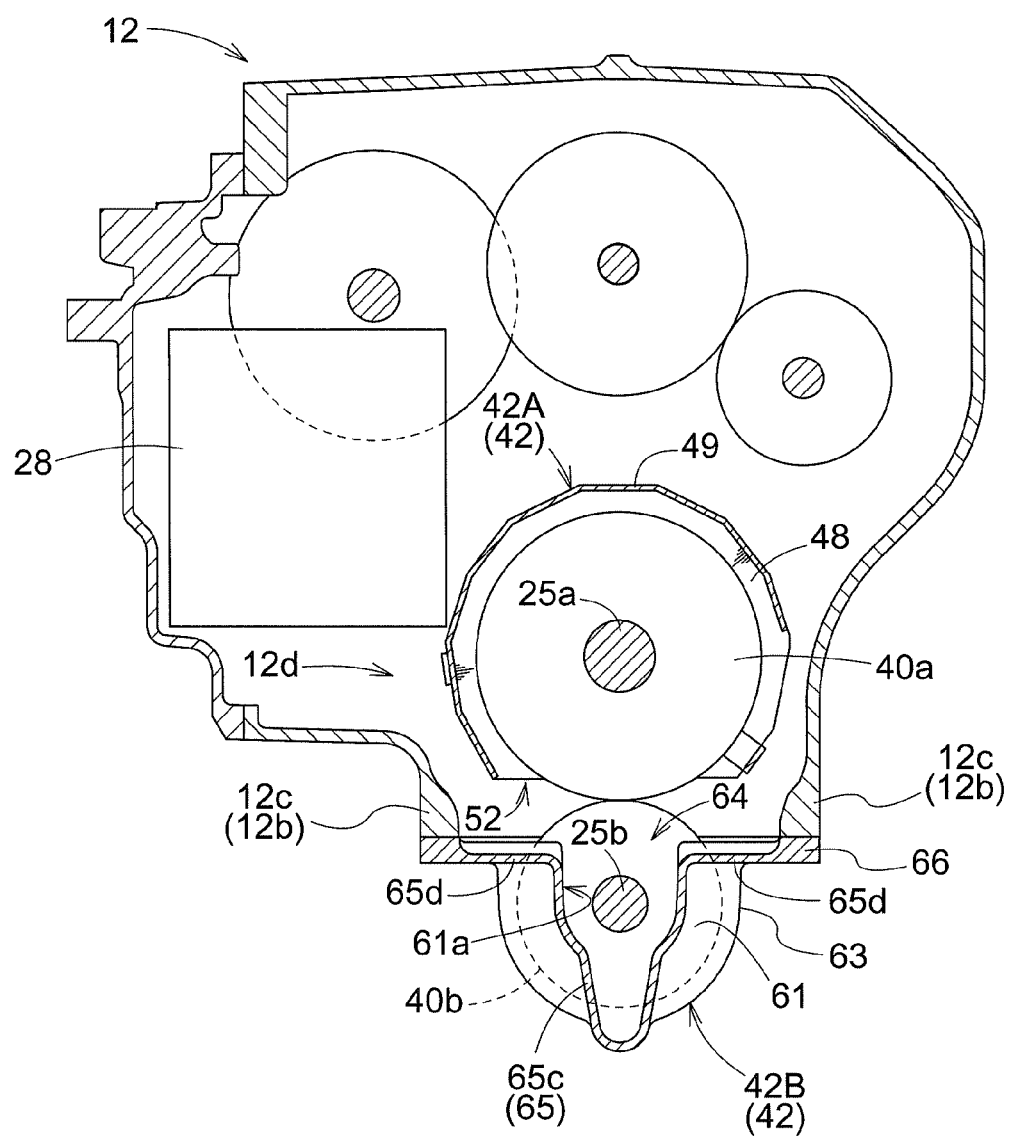
FIG. 5 is a cross-sectional view taken along the line V-V in FIG. 3.

As shown in FIGS. 3, 4, and 5, the first equal-speed power transmission gear 39a, the second equal-speed power transmission gear 39b, the first speed-increasing power transmission gear 40a, and the second speed-increasing power transmission gear 40b are provided in the bottom section 12d of the internal space of the transmission case 12. The first equal-speed power transmission gear 39a and the second equal-speed power transmission gear 39b are covered by a first gear cover 41, and the first speed-increasing power transmission gear 40a and the second speed-increasing power transmission gear 40b are covered by a second gear cover 42.

In the front-wheel power transmission unit 25, when the equal-speed clutch CLT is engaged, the motive power from the input shaft 25a is transmitted by the equal-speed clutch CLT and the equal-speed gear pair 39 to the output shaft 25b, the equal-speed gear pair 39 realizes an equal-speed power transmission state, and motive power that drives the front wheels 1 is output from the output shaft 25b so that the peripheral speed of the front wheels 1 is equal to the peripheral speed of the rear wheels 2. When the speed-increasing clutch CLH is engaged, the motive power from the input shaft 25a is transmitted by the speed-increasing clutch CLH and the speed-increasing gear pair 40 to the output shaft 25b, the speed-increasing gear pair 40 realizes a front-wheel speed-increasing power transmission state, and motive power that drives the front wheels 1 is output from the output shaft 25b so that the peripheral speed of the front wheels 1 is higher than the peripheral speed of the rear wheels 2. The output from the output shaft 25b is input to the front wheel differential mechanism 17 via a rotation shaft 43 that couples the output shaft 25b and an input shaft 17a of the front wheel differential mechanism 17.

In the travel body 3, when the equal-speed clutch CLT is engaged, a four-wheel drive state in which the front wheels 1 and the rear wheels 2 are driven so that the average peripheral speed of the left and right front wheels 1 is equal to the average peripheral speed of the left and right rear wheels 2 is realized, and when the speed-increasing clutch CLH is engaged, a four-wheel drive state in which the front wheels 1 and the rear wheels 2 are driven so that the average peripheral speed of the left and right front wheels 1 is higher than the average peripheral speed of the left and right rear wheels 2 is realized. As a result, when the speed-increasing clutch CLH is engaged, the travel body 3 is enabled to turn with a smaller turning radius than when the equal-speed clutch CLT is engaged.

When the equal-speed clutch CLT is engaged, the first equal-speed power transmission gear 39a and the second equal-speed power transmission gear 39b are rotated by the motive power from the input shaft 25a, and the first speed-increasing power transmission gear 40a and the second speed-increasing power transmission gear 40b are rotated by the motive power from the output shaft 25b. When the speed-increasing clutch CLH is engaged, the first speed-increasing power transmission gear 40a and the second speed-increasing power transmission gear 40b are rotated by the motive power from the input shaft 25a, and the first equal-speed power transmission gear 39a and the second equal-speed power transmission gear 39b are rotated by the motive power from the output shaft 25b. Although the lubricating oil stored in the transmission case 12 is agitated by the first equal-speed power transmission gear 39a, the second equal-speed power transmission gear 39b, the first speed-increasing power transmission gear 40a, and the second speed-increasing power transmission gear 40b, the first gear cover 41 prevents the agitation of the lubricating oil by the first equal-speed power transmission gear 39a and the second equal-speed power transmission gear 39b from spreading into the lubricating oil storage area. The second gear cover 42 prevents the agitation of the lubricating oil by the first speed-increasing power transmission gear 40a and the second speed-increasing power transmission gear 40b from spreading into the lubricating oil storage area.

First Gear Cover and Second Gear Cover

Figure 6:
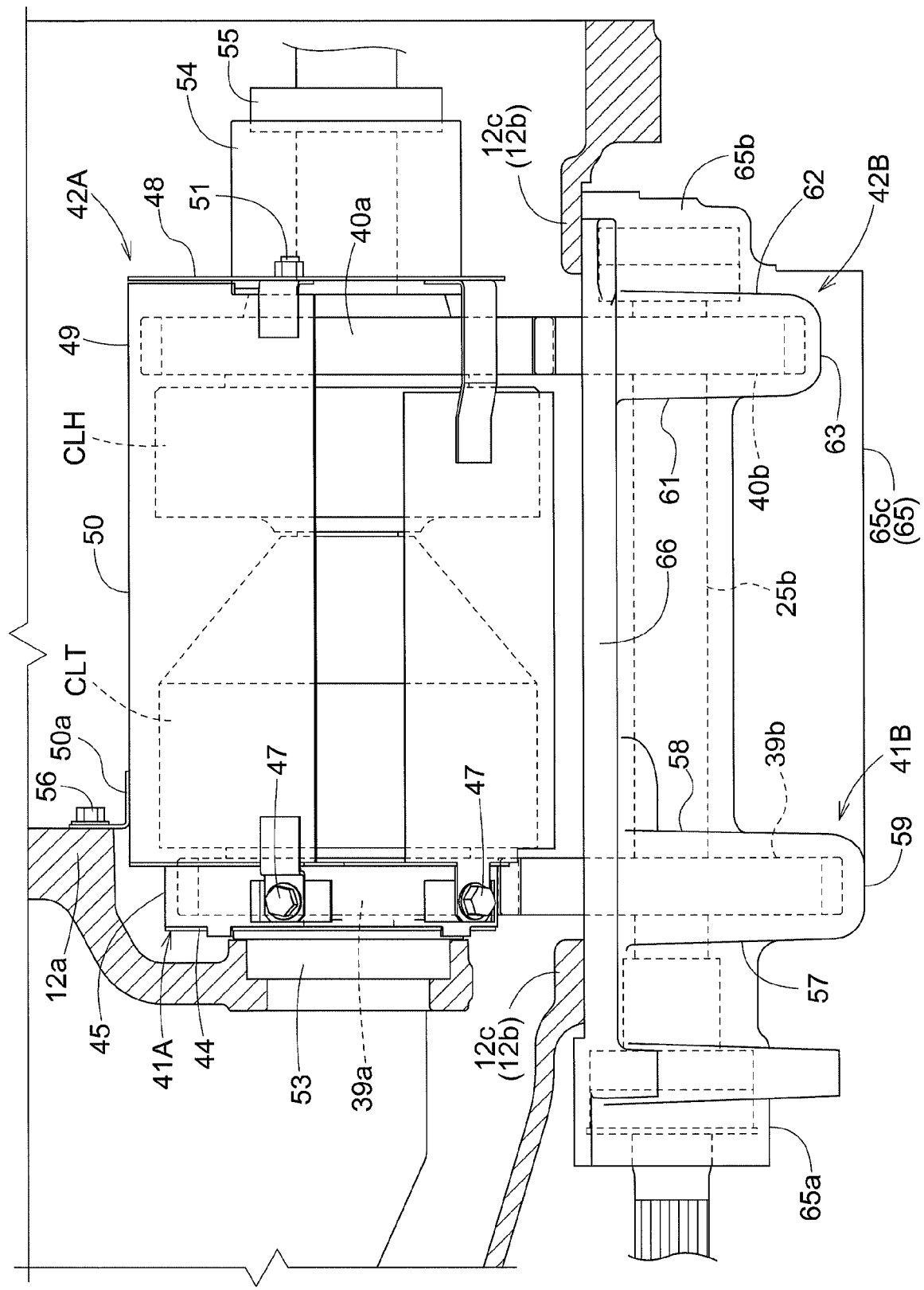
FIG. 6 is a side view showing a first gear cover, a second gear cover, and a clutch cover.
Figure 7:
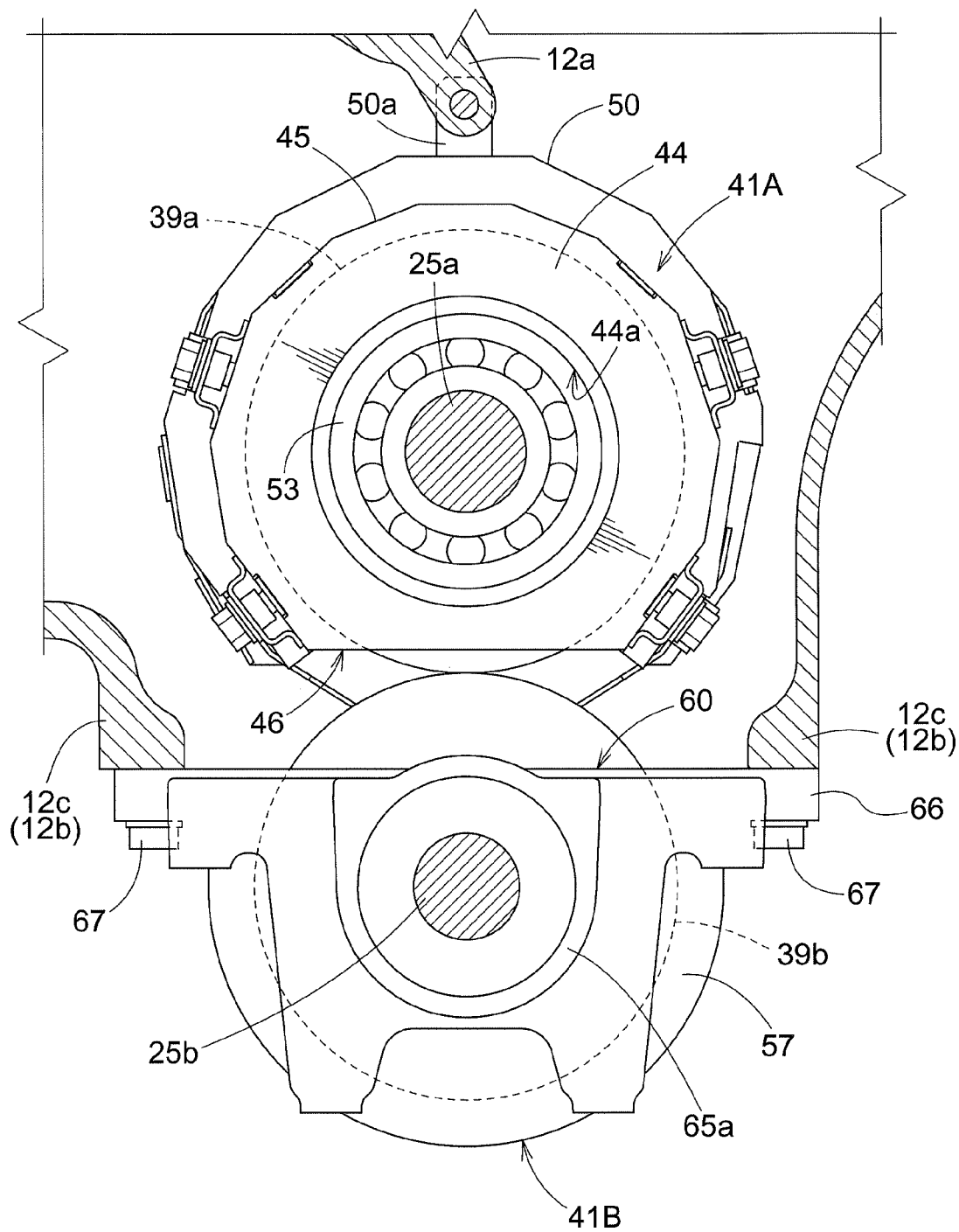
FIG. 7 is a front view showing the first gear cover.
Figure 8:
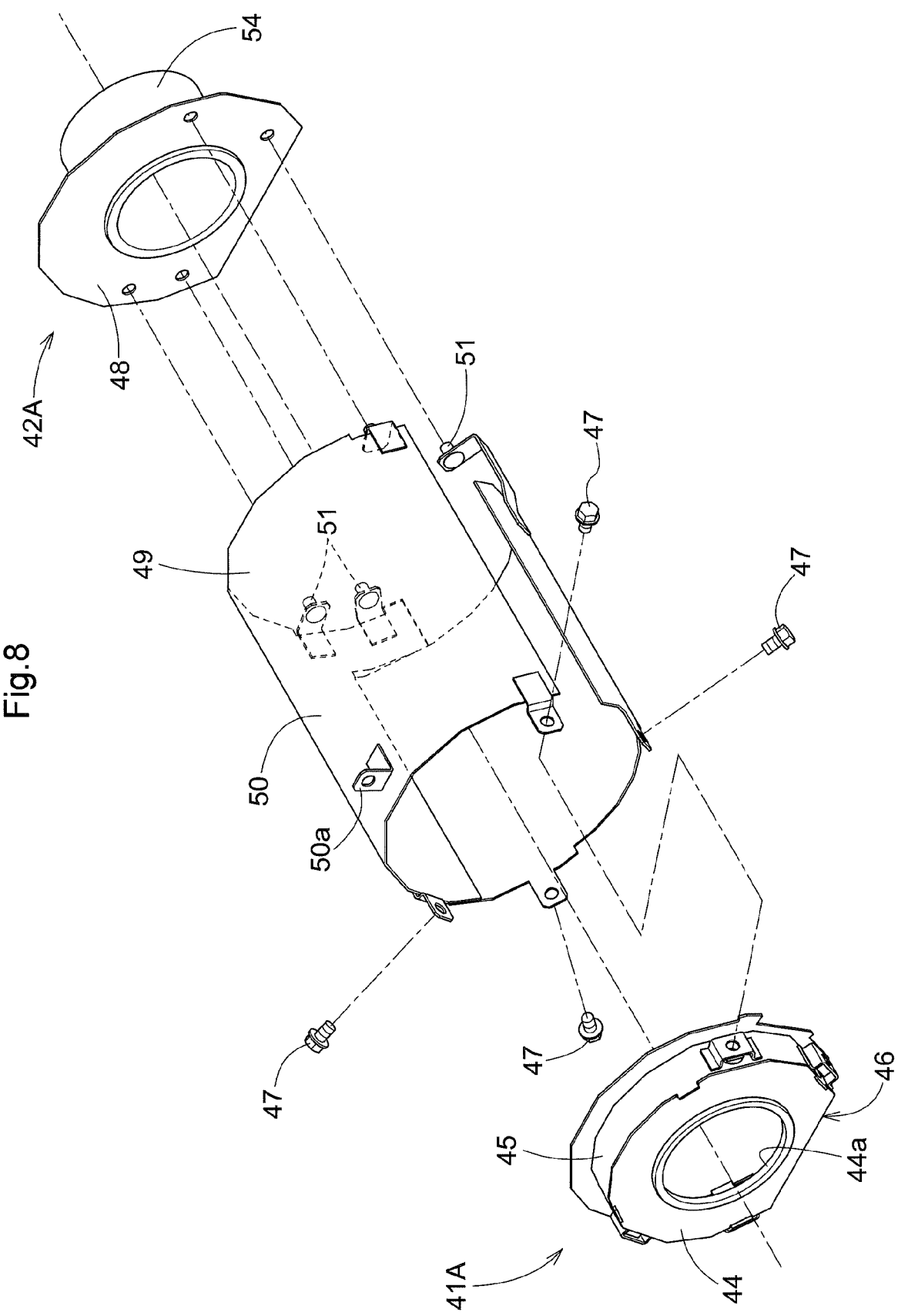
FIG. 8 is a perspective view showing a first equal-speed split cover, the clutch cover, and a first speed-increasing split cover in a disassembled state.

As shown in FIGS. 3, 4, 6, and 7, the first gear cover 41 is split into a first equal-speed split cover 41A that covers the first equal-speed power transmission gear 39a and a second equal-speed split cover 41B that covers the second equal-speed power transmission gear 39b. As shown in FIGS. 3, 5, and 6, the second gear cover 42 is split into a first speed-increasing split cover 42A that covers the first speed-increasing power transmission gear 40a and a second speed-increasing split cover 42B that covers the second speed-increasing power transmission gear 40b.

As shown in FIGS. 3, 4, 6, 7, and 8, the first equal-speed split cover 41A includes a front cover section 44 that covers the first equal-speed power transmission gear 39a from the front side, and a circumference cover section 45 that covers the first equal-speed power transmission gear 39a from the outer circumference thereof. The outer peripheral edge of the front cover portion 44 and the front end of the circumference cover section 45 are coupled to each other. The front cover section 44 and the circumference cover section 45 are coupled through welding. A lower section of the circumference cover section 45 is provided with an opening 46 from which a lower section of the first equal-speed power transmission gear 39a protrudes toward the second equal-speed power transmission gear 39b.

As shown in FIGS. 3, 5, 6, and 8, the first speed-increasing split cover 42A includes a rear cover section 48 that covers the first speed-increasing power transmission gear 40a from the rear side, and a circumference cover section 49 that covers the first speed-increasing power transmission gear 40a from the outer circumference thereof. The circumference cover section 49 is integrated with a rear end of a clutch cover 50 that covers the equal-speed clutch CLT and the speed-increasing clutch CLH from the outer circumferences thereof. The rear end of the circumference cover section 49 and the outer peripheral edge of the rear cover section 48 are coupled to each other. The coupling of the circumference cover section 49 and the rear cover section 48 to each other is realized by coupling front-rear coupling bolts 51 (see FIGS. 6 and 8), which is provided for the circumference cover section 49, to the rear cover section 48. A lower section of the circumference cover section 49 is provided with an opening 52 from which a lower section of the first speed-increasing power transmission gear 40a protrudes toward the second speed-increasing power transmission gear 40b.

As shown in FIGS. 3 and 6, an attachment hole 44a (see FIG. 8), which is provided in the front cover section 44 of the first equal-speed split cover 41A, is fitted onto a bearing 53 that supports a front section of the input shaft 25a, and the first equal-speed split cover 41A is supported by the bearing 53. An attachment cylinder section 54 (see FIG. 8), which is provided in the rear cover section 48 of the first speed-increasing split cover 42A, is fitted onto a bearing 55 that supports a rear section of the input shaft 25a, and the first speed-increasing split cover 42A is supported by the bearing 55. As shown in FIG. 3, a coupling bolt 56 couples a coupling section 50a (see FIG. 8), which is provided on an upper section of the clutch cover 50, to a supporting section 12a, which is provided in the transmission case 12. As shown in FIG. 6, a coupling bolt 47 (see FIG. 8) couples the first equal-speed split cover 41A and the clutch cover 50 to each other, and the clutch cover 50 prevents the first equal-speed split cover 41A from being rotated and positions the first equal-speed split cover 41A with respect to the first equal-speed power transmission gear 39a in the direction along the first rotation axis X1. The first speed-increasing split cover 42A and the clutch cover 50 are coupled to each other, and the clutch cover 50 prevents the first speed-increasing split cover 42A from being rotated, and positions the first speed-increasing split cover 42A with respect to the first speed-increasing power transmission gear 40a in the direction along the first rotation axis X1.

As shown in FIGS. 3, 4, 6, 7, and 9, the second equal-speed split cover 41B includes a front cover section 57 that covers the second equal-speed power transmission gear 39b from the front side, a rear cover section 58 that covers the second equal-speed power transmission gear 39b from the rear side, and a circumference cover section 59 that covers the second equal-speed power transmission gear 39b from the outer circumference thereof. The front cover section 57 is provided with a through hole 57a into which the output shaft 25b is inserted, and the rear cover section 58 is provided with a cutout 58a through which the output shaft 25b is inserted. An upper section of the circumference cover section 59 is provided with an opening 60 from which an upper section of the second equal-speed power transmission gear 39b protrudes toward the first equal-speed power transmission gear 39a.

As shown in FIGS. 3, 4, 5, 6, and 9, the second speed-increasing split cover 42B includes a front cover section 61 that covers the second speed-increasing power transmission gear 40b from the front side, a rear cover section 62 that covers the second speed-increasing power transmission gear 40b from the rear side, and a circumference cover section 63 that covers the second speed-increasing power transmission gear 40b from the outer circumference thereof. The front cover section 61 is provided with a cutout 61a into which the output shaft 25b is inserted, and the rear cover section 62 is provided with a through hole 62a through which the output shaft 25b is inserted. An upper section of the circumference cover section 63 is provided with an opening 64 from which an upper section of the second speed-increasing power transmission gear 40b protrudes toward the first speed-increasing power transmission gear 40a.

Figure 9:
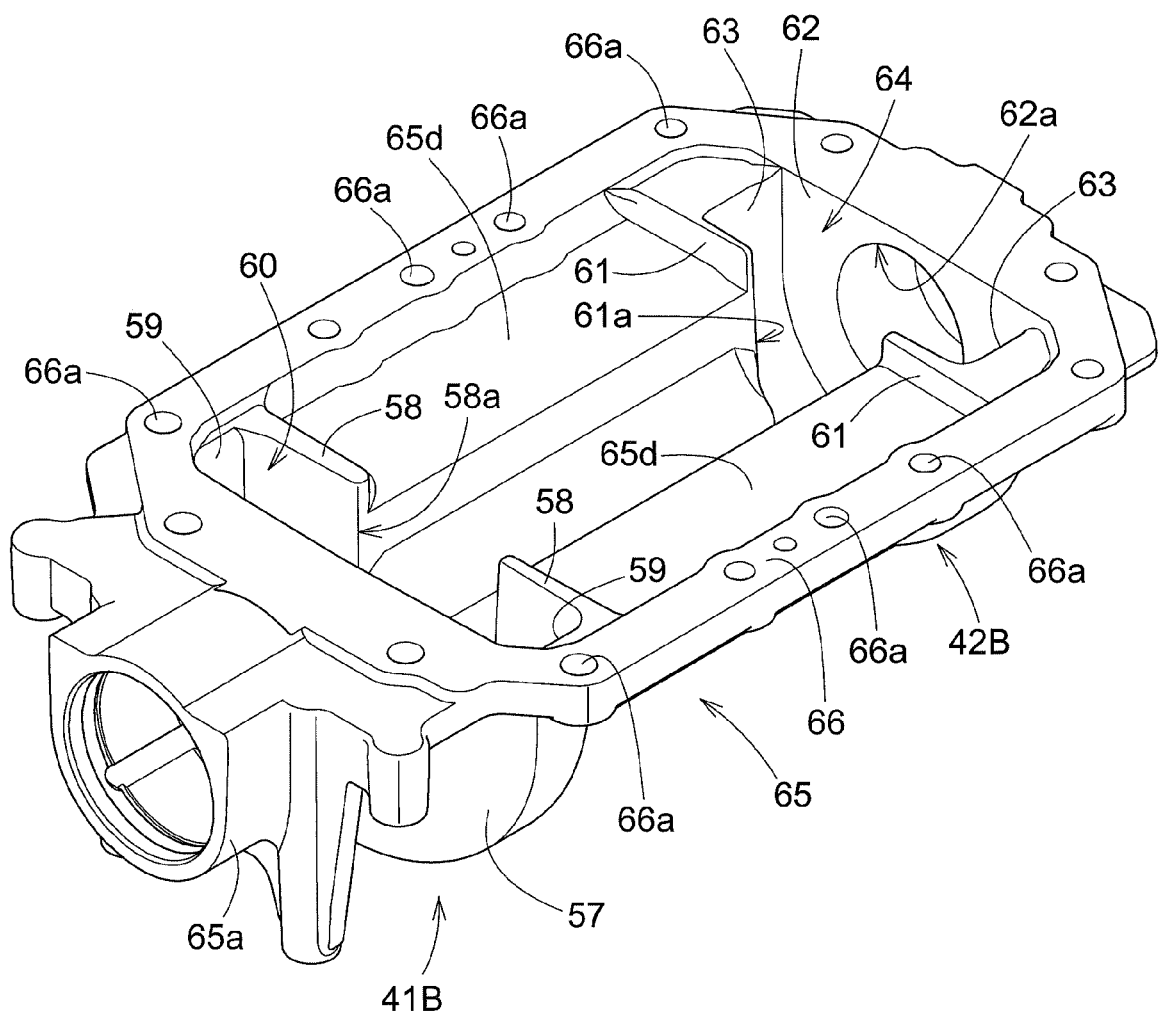
FIG. 9 is a perspective view showing a second equal-speed split cover, a second speed-increasing split cover, and a bottom wall.

As shown in FIG. 3, 6, 9, and so on, the second equal-speed split cover 41B and the second speed-increasing split cover 42B are supported by a bottom wall 65 of the transmission case 12. The second equal-speed split cover 41B and the second speed-increasing split cover 42B are supported by the bottom wall 65 in such a manner that the second equal-speed split cover 41B and the second speed-increasing split cover 42B are integrated with the bottom wall 65. As shown in FIGS. 4, 5, 6, and 9, the bottom wall 65 is at a position between the rear cover section 58 of the second equal-speed split cover 41B and the front cover section 61 of the second speed-increasing split cover 42B, and includes a coupling section 65c that couples the rear cover section 58 and the front cover section 61 to each other, and a horizontal section 65d that is connected to an upper section of the coupling section 65c and has a flange 66. The coupling section 65c has an internal space through which the output shaft 25b passes. The width of the coupling section 65c is smaller than the outer diameter of the second equal-speed split cover 41B and the second speed-increasing split cover 42B.

The bottom wall 65 is configured to be detachable from a clutch housing 12c of a body 12b of the transmission case 12. The clutch housing 12c houses the equal-speed clutch CLT and the speed-increasing clutch CLH. Specifically, as shown in FIGS. 5, 6, 9, and so on, the bottom wall 65 has the flange 66 provided on an upper section of the bottom wall 65, and coupling bolts 67 (see FIG. 7), which are inserted from below into coupling holes 66a (see FIG. 9) provided at multiple positions in the flange 66, engage with the clutch housing 12c, and accordingly the bottom wall 65 is coupled to the clutch housing 12c of the body 12b by the coupling bolts 67.

As shown in FIGS. 3 and 6, the bottom wall 65 includes a front supporting section 65a into which a front section of the output shaft 25b is inserted via a bearing 68, and a rear supporting section 65b into which a rear section of the output shaft 25b is inserted via a bearing 68, and the bottom wall 65 is configured so that the front supporting section 65a and the rear supporting section 65b support the output shaft 25b. The output shaft 25b is supported by the bottom wall 65. With this configuration, the second speed-increasing split cover 42B positions the second speed-increasing power transmission gear 40b and the second equal-speed power transmission gear 39b with respect to a rear section of the bottom wall 65, and the second equal-speed split cover 41B positions the second speed-increasing power transmission gear 40b and the second equal-speed power transmission gear 39b with respect to a front section of the bottom wall 65. In addition, the second equal-speed split cover 41B is positioned with respect to the second equal-speed power transmission gear 39b in the direction along the second rotation axis X2, and the second speed-increasing split cover 42B is positioned with respect to the second speed-increasing power transmission gear 40b in the direction along the second rotation axis X2. It is possible to attach the second equal-speed power transmission gear 39b, the second speed-increasing power transmission gear 40b, the second equal-speed split cover 41B, and the second speed-increasing split cover 42B to the transmission case 12 by attaching the bottom wall 65 to the body 12b.

(1) Although the above embodiment describes an example in which the front wheels 1 and the rear wheels 2 are provided, a crawler travel device or a mini crawler may be employed as a travel device.

(2) Although the above embodiment describes an example in which the equal-speed gear pair 39 and the speed-increasing gear pair 40 are provided as a gear pair, the present invention is not limited to such a configuration, and a gear pair that transmits motive power only to the rear wheels 2 or a gear pair that simply transmits motive power without changing the transmission speed thereof may be employed.

(3) Although the above embodiment describes an example in which the first gear cover 41 can be split into the first equal-speed split cover 41A and the second equal-speed split cover 41B and the second gear cover 42 can be split into the first speed-increasing split cover 42A and the second speed-increasing split cover 42B, the present invention is not limited to such a configuration, and unsplittable cover may be employed.

(4) Although the above embodiment describes an example in which the second equal-speed split cover 41B and the second speed-increasing split cover 42B are integrated with the bottom wall 65, split covers that are separate from the bottom wall 65 and are not supported by the bottom wall 65, or split covers that are separate from the bottom wall 65 and are supported by the bottom wall 65 may be employed.

(5) Although the above embodiment describes an example in which the bottom wall 65 is detachable from the clutch housing 12c, a bottom wall that is integrated with the clutch housing 12c and cannot be detached from the clutch housing 12c may be employed.

(6) Although the above embodiment describes an example in which the motive power source is the engine 4, an electric motor may be employed as a power source.

(7) The present invention is applicable to a transmission that outputs power to a travel device, and a work vehicle provided with a transmission case that houses the transmission.

DESCRIPTION OF REFERENCE SIGNS

1 Front Wheel (Travel Device)
2 Rear Wheel (Rear Travel Device)
4 Engine (Motive Power Source)
12 Transmission Case
12b Body
12d Bottom Section
18 Transmission
25 Front-Wheel Power Transmission Unit
39 Equal-Speed Gear Pair (Gear Pair)
39a First Equal-Speed Power Transmission Gear (First Power Transmission Gear)
39b Second Equal-Speed Power Transmission Gear (Second Power Transmission Gear)
40 Speed-Increasing Gear Pair (Gear Pair)
40a First Speed-Increasing Power Transmission Gear (First Power Transmission Gear)
40b Second Speed-Increasing Power Transmission Gear (Second Power Transmission Gear)
41 First Gear Cover (Gear Cover)
41A First Equal-Speed Split Cover (First Split Cover)
41B Second Equal-Speed Split Cover (Second Split Cover)
42 Second Gear Cover (Gear Cover)
42A First Speed-Increasing Split Cover (First Split Cover)
42B Second Speed-Increasing Split Cover (Second Split Cover)
65 Bottom Wall

What is claimed is:

1. A work vehicle comprising:
a transmission configured to receive motive power input from a motive power source, and shift and output the input motive power to a travel device;
a transmission case housing the transmission; and
at least one gear pair disposed in the transmission, in a bottom section of an internal space of the transmission case, and including (i) a first power transmission gear configured to rotate about a first rotation axis, and (ii) a second power transmission gear configured to mesh with the first power transmission gear and rotate about a second rotation axis parallel with the first rotation axis,
wherein the work vehicle further comprises at least one gear cover covering the first power transmission gear and the second power transmission gear, and
wherein the at least one gear cover includes a first split cover covering at least an entire upper portion of the first power transmission gear in a circumferential direction of the first power transmission gear, and a second split cover covering at least a lower portion of the second power transmission gear in a circumferential direction of the second power transmission gear.

2. The work vehicle according to claim 1,
wherein the second split cover is provided as a portion of a bottom wall of the transmission case.

3. The work vehicle according to claim 2,
wherein the bottom wall is configured to be detachable from a body of the transmission case.

4. The work vehicle according to claim 1,
wherein the first split cover further includes a front cover section and a rear cover section,
wherein a clutch cover provided in between the front cover section and the rear cover section, and
wherein the front cover section, the rear cover section, and the clutch cover extend along a rotation axis of the first power transmission gear.

* * * * *